United States Patent [19]

Shirn et al.

[11] 4,107,759
[45] Aug. 15, 1978

[54] FUSED MONOLITHIC CERAMIC CAPACITOR PACKAGE

[75] Inventors: George A. Shirn, Williamstown; John P. Maher, Adams, both of Mass.

[73] Assignee: Sprague Electric Company, North Adams, Mass.

[21] Appl. No.: 797,203

[22] Filed: May 16, 1977

[51] Int. Cl.² .............................................. H01G 1/11
[52] U.S. Cl. .................................... 361/275; 361/321
[58] Field of Search ....................... 361/274, 275, 321

[56] References Cited

U.S. PATENT DOCUMENTS

| 1,255,597 | 2/1918 | Giles | 361/275 X |
| 3,638,083 | 1/1972 | Dornfeld | 361/275 |

Primary Examiner—E. A. Goldberg

Attorney, Agent, or Firm—Connolly and Hutz

[57] ABSTRACT

A fuse for a monolithic ceramic capacitor is made of two exothermically alloyable materials such as aluminum and palladium. A monolithic ceramic body has two conventional conductive layer terminals contacting two groups of buried film electrodes. The body also has a third conductive layer that is spaced from the conventional terminals and the electrodes. A fuse is connected between a conventional terminal and the third layer. Alternatively, the conventional body without the third layer has two leads, one of which is connected to a first of the terminals and the other of which is insulated from both terminals but physically attached to the body. In this case the fuse is connected between the insulated of the leads and the second of the terminals.

14 Claims, 11 Drawing Figures

U.S. Patent  Aug. 15, 1978  4,107,759
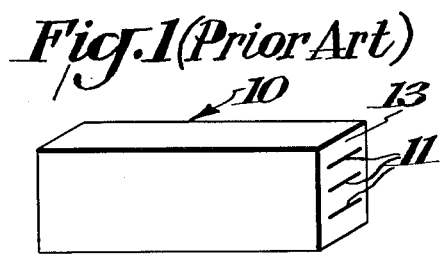
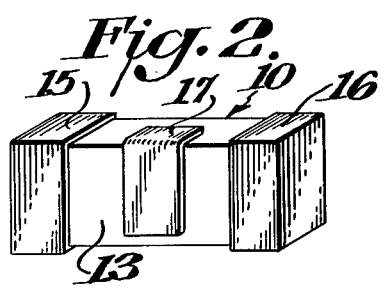
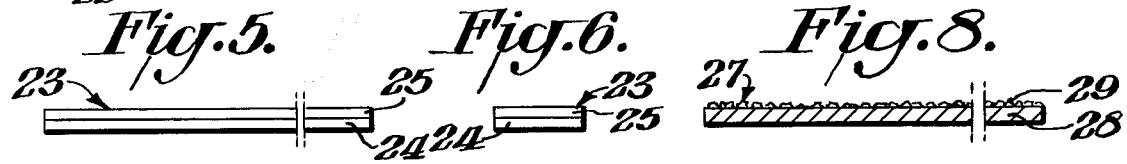
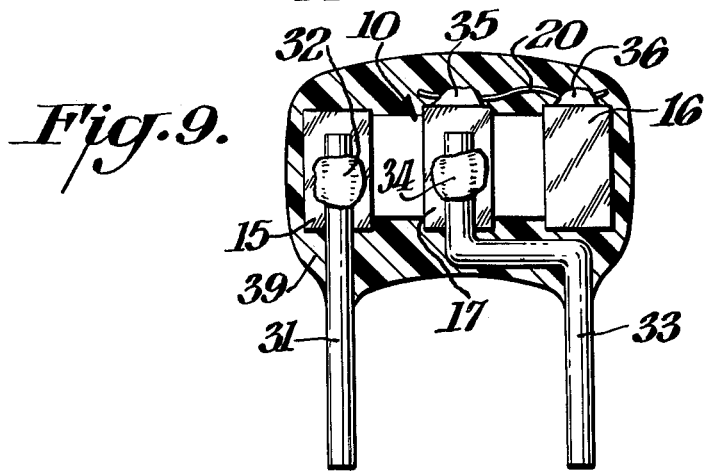
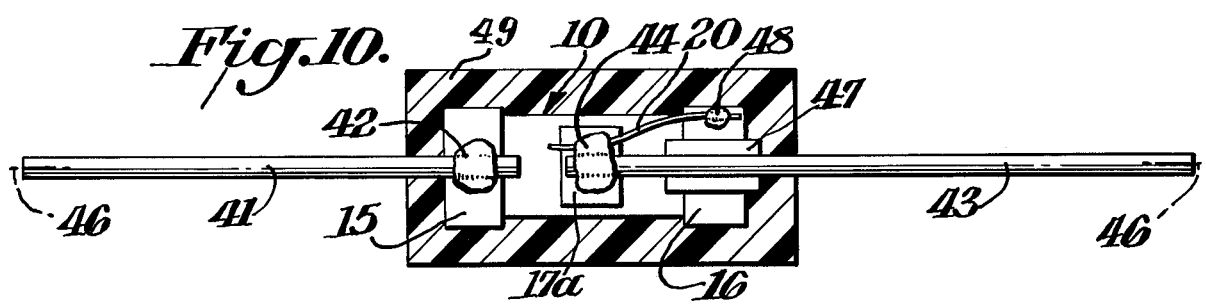
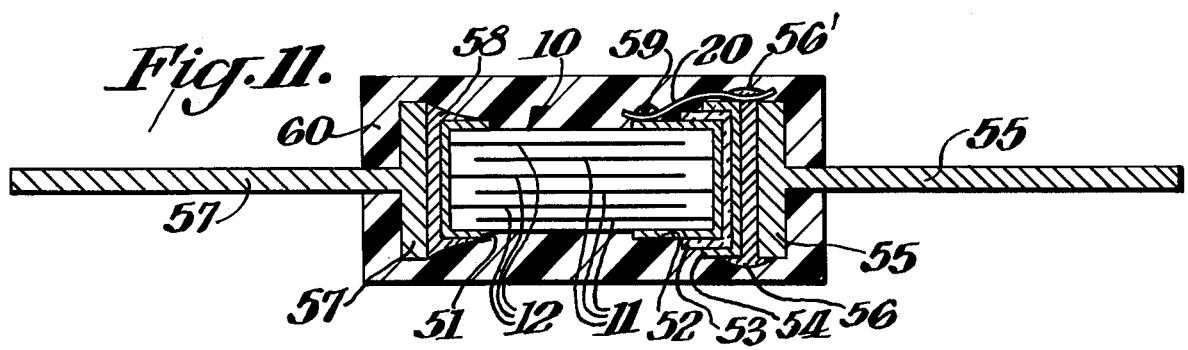

FUSED MONOLITHIC CERAMIC CAPACITOR PACKAGE

BACKGROUND OF THE INVENTION

This invention relates to a fused monolithic ceramic capacitor package and more particularly to such a package containing an exothermically alloyable fuse.

Monolithic ceramic capacitors have at least two film electrodes that are buried within a dielectric ceramic body and that are spaced from each other by a thin layer of the ceramic material. When voltage is applied to the capacitor, an electric field is established within this thin ceramic layer which layer is typically from 0.0005 inch to 0.003 inch (0.0013 to 0.0075 cm.) thick. It ocasionally occurs that due to minor defects in this active dielectric layer small currents are established through the active dielectric layer which cause its temperature to rise. Leakage current tends to increase with increasing temperature and the whole body becomes progressively hotter. Ceramic capacitors thus tend to fail short.

In recent years it has become increasingly common practice to employ literally hundreds of monolithic ceramics on a single printed circuit board that also carries a large number of integrated circuit components, e.g. MOS-memory chips. The capacitors are typically connected directly across the low voltage power supply that has a large current capacity. Such boards are very expensive, e.g. $200–$400. When one of the many ceramic capacitors becomes defective, as described above, its temperature can easily exceed 1000° C igniting and burning nearby components and often burning through the supporting board to the boards that may lie below.

It is accordingly an object of the present invention to provide a monolithic ceramic capacitor package that fails open prior to reaching destructive temperatures.

SUMMARY OF THE INVENTION

A fused monolithic ceramic capacitor package includes a monolithic ceramic capacitor body having two terminals, a housing enclosing the body, and two leads extending to the outside of the housing. The improvement comprises a fuse made of two exothermically alloyable elements in intimate contact with each other, and a connection of the fuse between one of the body terminals and one of the leads. The other lead is connected to the other terminal. A thermal connection is provided between the fuse and the body. The body and the fuse may be encompassed by an organic resin encapsulation that may serve as at least a portion of the housing and may additionally provide a major part of the aforesaid thermal connection.

In another package of this invention a conventional ceramic body has at least two spaced film electrodes buried in the body. One of the electrodes extends to a first surface region of the body and the other electrode extends to another surface region of the body. A first conventional termination consisting of a conductive layer is disposed over the first surface region and a second conventional termination consisting of a conductive layer is disposed over the end surface region. A third termination consisting of a conductive layer is disposed over the third surface region of the body and an exothermically alloyable fuse is connected between the second and third terminations so that the first and third terminations may serve as the external terminals to which electrical access may be had to the fused capacitor package. An insulative organic resin coating may be disposed over a portion of the body and the fuse being embedded in this resin coating to provide physical protection of the fuse and enhanced thermal coupling of the fuse to the body.

In the package of this invention, the above-noted thermal connection, e.g. the electrical joint of the fuse to a body termination, provides a means by which a faulty and overheated body may kindle and cause the obliteration of essentially the whole fuse. The term kindle as used herein means to initiate alloying of the fuse, leading to a self sustaining progressive exothermic alloying which is characterized by a sputtering dispersion of molten alloy particles. Since moderately high fault current in a monolithic ceramic capacitor body tends to raise the temperature of the body to high and destructive values, and the same current may not be high enough to open the fuse by self heating, i.e. $I^2R$ heating, the thermally coupled exothermically alloyable fuse in the package of this invention provides a positive degree of protection heretofore unavailable against destructive failure of monolithic ceramic capacitors.

The total or near total obliteration of the fuse has the further advantage in the package of this invention that a substantial gap is always created in the space having been occupied by the fuse, so that even when large voltages appear across the "opened" fuse, the probability of arcing is greatly reduced. The conventional melting fuses tend to melt only to the extent that the circuit is broken, the current is interrupted and no further melting occurs. When a high enough voltage appears across the open fuse, moderately high arc currents may still flow at a level low enough to avoid melting of the remainder of the fuse but high enough to ultimately cause the capacitor to reach destructive temperatures.

Conventional melting fuses also tend to be totally ineffective when encapsulated in a resin because the encapsulant contains the liquid metal maintaining electrical continuity through it.

It is also preferred that the kindling temperature of the fuse in the package of this invention be greater than about 300° C to avoid kindling the fuse when the capacitor is being soldered into a circuit. A well known commercial test to which such capacitors are subjected to determine their ability to withstand the soldering operation, consists of exposure to a temperature of 360° C for 3 minutes without degradation of the capacitor package properties. Even higher test temperatures are anticipated in the future. It is therefore preferred for a more universal use that the kindling temperature of the alloyable fuse be greater than about 400° C.

The exothermically alloying fuse of this invention is also capable of overcoming the above noted liquid melt confinement problem. It abruptly alloys when it reaches a characteristic alloying temperature and it momentarily becomes very much hotter which burns away some of the adjacent organic encapsulant and very quickly opens the series circuit that includes the faulty or shorted capacitor body. Also when the fuse is located near an outer surface of the encapsulant, it will advantageously burn through this region of the encapsulant making identification of the defective capacitor package readily apparent.

It should be noted that the amount of heat generated during alloying is directly proportional to the mass of the fuse. This heat is in effect stored chemical energy that is released when the fuse is kindled. The mass of the fuse is selected so that its stored chemical energy is less than sufficient to raise the temperature of the capacitor body to its ignition temperature.

The characteristic kindling temperature of the exothermically alloyable fuse of this invention corresponds very nearly to the melting temperature of the lowest melting element of the two metal element fuse. The characteristic kindling temperature of an aluminum-palladium fuse is 650° C, approximately the melting point of aluminum. This invention also contemplates a fuse wherein the lowest melting element is an alloy whose composition is chosen to obtain the desired characteristic kindling temperature. In particular the eutectic alloy 70% Al 30% Mg has a melting temperature of 435° C, the aluminum alloys having lesser quantities of magnesium providing a continuous range of melting points from 660° C to 435° C. Also a bi-metallic fuse of palladium and magnesium is advantageously strongly exothermic in alloying. Thus, fuses combining palladium with various of the aluminum-magnesium alloys offer a broad range of kindling temperatures. Lower cost fuse pairs, employing only base metals, such as Al/Cu and Al/Ag, though being less exothermic at alloying may also be suitable.

BRIEF DESCRIPTION OF THE DRAWING

FIG. 1 shows in perspective view a monolithic ceramic capacitor body of the prior art.

FIG. 2 shows the body of FIG. 1 with conventional terminations at opposite ends thereof and with a third conductive pad.

FIG. 3 shows a side view of an exothermically alloyable fuse wire of this invention.

FIG. 4 shows the end view of the fuse wire of FIG. 3.

FIG. 5 shows in side view an alloyable fuse strip of this invention.

FIG. 6 shows in end view the fuse strip of FIG. 5.

FIG. 7 shows in side sectional view another alloyable fuse wire of this invention.

FIG. 8 shows in side sectional view another alloyable fuse strip of this invention.

FIG. 9 shows in side view a fused capacitor package of this invention having radial leads with the encapsulating material shown in section to reveal the internal construction.

FIG. 10 shows in side view a fused capacitor package of this invention having axially extending leads.

FIG. 11 shows in side sectional view another axial leaded capacitor package of this invention.

DESCRIPTION OF THE PREFERRED EMBODIMENTS

A conventional monolithic ceramic capacitor body 10 as shown in FIG. 1 has a first group of electrodes (not shown) and a mutually interdigitated second group of electrodes 11 buried within a dielectric ceramic material 13. The ends of the first group of electrodes extend to the hidden left hand end of the body while the second group electrodes extend to the opposite and right hand end of the body 10 as shown.

Referring to FIG. 2, the body 10 is shown having two conformal cup shaped metal coatings 15 and 16 on the two above noted opposite ends of the body 10. These coatings may be formed by the conventional process of applying, as by dipping or brushing on the two body ends an ink containing a glass frit, silver particles and an organic binder. The ink consists of 60% by weight of silver particles and a lead borosilicate glass having a melting temperature of about 600° C mixed in terpineol with ethyl cellulose as a binder. The ink coatings are then fired at 850° C to burn out the organic binder and to sinter the glass and silver forming a continuously conducting termination at each end.

In the process of making a capacitor package of this invention, a third coating of the silver ink may be applied, as by brushing, to a central region of the capacitor body, which surface region is spaced and insulated from the electrodes 11 and 12 by an outerlayer of the ceramic dielectric material 13. The firing of the third conductive coating 17 may be accomplished simultaneously with that of the terminations 15 and 16. The use to be made of the termination 17 in a package of this invention illustrated in FIG. 9 is elaborated below.

An exothermically alloyable fuse wire 20 that is also employed in the embodiment of FIG. 9 is shown enlarged in FIGS. 3 and 4. It consists of an aluminum core 21 that is clad with a layer of palladium 22. When any region of this fuse wire reaches a temperature of about 650° C (1200° F), an exothermic alloying of the two metal elements 21 and 22 is initiated in that region and progressively moves along the entire length of the wire. This exothermic reaction quickly raises the temperature of the alloying wire to temperatures on the order of 2800° C (5000° F) which results in the melting of the alloy and immediate loss of physical stability and form. No oxygen is required for the reaction although when exposed to air during alloying, the hot alloying particles or debris tend to oxidize and become insulative.

Referring to FIGS. 5 and 6, an alternative exothermically alloyable fuse 23 is shown that may be substituted for the wire 20 in the package illustrated in FIG. 9, having the advantage thereover that less inductance is introduced in the package circuit. This lower inductance may be important in capacitor packages intended for passing high frequency signals, e.g. above 10MHz. The aluminum ribbon 24 and the palladium ribbon 25 are in intimate contact along the long dimension of the fuse strip 23, and initiation and progress of alloy fusing occurs in exactly the same manner as for the fuse wire 20.

Referring to FIG. 7, another bimetal fuse 26 that may be substituted for fuse wire 20 consists of a powder compact that includes a homogeneous mixture of particles of palladium and aluminum. The powder compact may be held together by an organic binder medium. It may be manufactured by extruding or molding a mixture of the metal particles in an organic binder solution, such as polyvinyl alcohol in a water vehicle. Preformed pieces, such as that shown in FIG. 7 may be dried to remove the vehicle and to provide a rigid fuse member of any convenient geometry for connection into a capacitor package.

FIG. 8 illustrates yet another suitable alloyable fuse 27 having an aluminum ribbon 28 to which a layer of palladium particles 29 is bonded. The bond may be facilitated by means of an organic binder or by pressing the powder into the surface of the aluminum.

In the first preferred embodiment of a fused capacitor package of this invention, shown in FIG. 9, the terminated capacitor body 10 of FIG. 2 has a tinned copper lead wire 31 that is connected to termination 15 by a solder joint 32. Likewise a bent tinned copper lead wire 33 is connected to the front (as shown) surface portion of the conductive coating 17 by a solder joint 34. One end of the fuse wire 20 is connected by solder joint 35 to a top (as shown) surface portion of the pad 17. The other end of the fuse wire is connected to the termination 16 by solder joint 36. The fuse 20 therefore has a series electrical connection with the capacitor body. The solder employed is 60%Sn 40%Pb having a melting temperature of 188° C.

The above described assembly may now be held by the extending portions of the lead wires and dipped into a liquid epoxy resin so as to encapsulate the body 10 and fuse wire 20. The body 10 and the fuse wire 20 are encompassed in an organic encapsulating resin 39. This encapsulant provides protection to the capacitor body against physical and other environmental damage, provides substantial physical support to the leads, and may provide a broad thermal path between the body 10 and the central regions of fuse. The solder connection 35 provides in this structure a more substantial thermal connection between the capacitor body and the fuse.

A fault current established in the body raises the temperature of the fuse to that required to initiate kindling of the fuse metals before the body temperature becomes high enough to burn or to ignite the adjacent printed wiring board and adjacent components with which it may be connected in an electronic system.

The palladium clad aluminum fuse wire 20 has a diameter of 0.002 inch (0.005 cm.) and approximately equal amounts of palladium and aluminum by volume in the clad regions.

In a modification of the first preferred embodiment which is illustrated in FIG. 9, the leads 31 and 33 may be omitted and the encapsulating resin 39 may be omitted (not shown) from portions of each of the terminations 15 and 17. In this modified package, the exposed portions of terminations 15 and 17 may serve as the external terminals of the package.

In a second preferred embodiment illustrated in FIG. 10, the body 10 has terminations 15 and 16 as shown in FIG. 2 but the centrally located termination 17a only occupies a region on the front (as shown) surface of the body. A lead wire 41 is connected by solder joint 42 to termination 15 at the same front surface and extends leftward (as shown) in an axial direction away from the body. Another lead wire 43 is connected to the termination 17a by solder joint 44 and extends to the right (as shown) in an axial direction away from the body so that both lead wires lie in the same axial line 46.

An insulative sheet 47 of paper or the like spaces and insulates the leadwire 43 from termination 16. An end of fuse wire 20 is also connected to termination 17a by solder joint 44. The other end of fuse 20 is connected to termination 16 by solder joint 48. A molding resin 49 encapsulates the body 10, and the fuse 20.

In a third preferred embodiment of FIG. 11 the body 10 has two terminations 51 and 52 formed at either end of the body. Termination 52 extends further along the central surface regions of the body than would be required for simply forming a solderable termination to which a lead wire may be attached as is exemplified by the shorter termination 51.

A glass insulated layer 53 is disposed over an end portion of termination 52 leaving bare a centrally extending region of termination 52. Another conductive coating 54 is disposed over an end portion of the insulated glass layer 53. A nailheaded lead wire 55, similar to those employed by Heron in U.S. Pat. No. 3,710,210 issued Jan. 9, 1973 is connected to the termination 54 by solder joint 56. A similar nailheaded lead wire 57 is connected by solder joint 58 to the opposite termination 51.

In making the above structure, the above described silver ink is used for forming the termination 52. After firing at 850° C, this termination is dipped into the same ink mixture having been modified by omitting the silver and adding alumina. The alumina amounts to 40% by weight of the sum of the alumina and glass mixture and provides a more viscous layer during subsequent firings. The glass layer is fired at 850° C. The fired glass layer 53 is then partially dipped in the above noted silver ink and fired at 750° C to form termination 54.

The fuse wire 20 is then connected by solder joint 59 to a bare portion of the centrally extending termination 52 and by the solder joint 56 to the lead wire 55, effectively placing the fuse wire in series with the capacitor with respect to the two leads 55 and 57. The body 10 and the fuse wire 20 are encompassed in an organic encapsulating resin 60 by a standard molding process. The insulative glass layer 53 serves the dual roles of providing a spacing and electrical insulation between lead wire 55 and termination 52 while providing a strong mechanical connection between the lead wire 55 and the body 10.

What is claimed is:

1. A fused monolithic ceramic capacitor package comprising a monolithic ceramic capacitor body having two sets of buried electrodes, three terminations on said body, a resin housing enclosing said capacitor body and said terminations, a first of said terminations connected to one of said sets of electrodes, a second of said terminations connected to the other of said sets of electrodes, a fuse of two exothermically alloyable metal elements in intimate contact with each other, said fuse being embedded in said resin housing, said fuse having a thermal connection to said capacitor body and an electrical connection between said second termination and a third of said terminations to provide a series electrical connection with said capacitor body, and external electrical terminals to said first termination and to said third termination, respectively, to provide electrical access to said capacitor body.

2. The capacitor package of claim 1 wherein said two metal elements are of aluminum and palladium, respectively.

3. The package of claim 1 wherein the lowest melting of said two metal elements is an alloy.

4. The package of claim 3 wherein one of said elements is palladium and the other of said elements is an alloy of aluminum and magnesium.

5. The capacitor package of claim 1 wherein the characteristic kindling temperature of said fuse is greater than 300° C.

6. The capacitor package of claim 1 wherein said first and second terminations consist of conformal metal coatings on opposite ends of said body, respectively, said third termination consisting of a metal coating being centrally located on said body between and spaced from said first and second terminations, said terminals being lead wires, one of said wires being connected to said first termination and the other of said wires being connected to said third termination to effect said series electrical connection.

7. The capacitor package of claim 6 additionally comprising an insulative layer between said one lead wire and said one termination.

8. The package of claim 1 wherein each of said metal elements is an elongated piece, said intimate contact extending along the lengths of said elements.

9. The capacitor package of claim 1 wherein said intimate contact extends to one end of said fuse and said series connection includes a solder joint at said one end.

10. The capacitor package of claim 1 wherein one of said metal elements is a wire and the other of said metal elements is clad over said wire.

11. The capacitor package of claim 8 wherein each of said elongated elements is in the form of a ribbon.

12. The capacitor package of claim 1 wherein said fuse is a powder compact including a homogeneous mixture of particles of one and particles of the other of said two metal elements, respectively.

13. The capacitor of claim 1 wherein one of said elements is in the form of a unitary piece and the other of said elements is a powder being bonded to a surface of said one element.

14. A fused monolithic ceramic capacitor package including a ceramic body having at least two spaced film electrodes buried in said body, one of said electrodes extending to a first surface region of said body and the other of said electrodes extending to another surface region of said body, a first termination consisting of a conductive layer disposed over said first surface region and a second termination consisting of a conductive layer disposed over said second surface region; wherein the improvement comprises a third termination consisting of a conductive layer being disposed over a third surface region of said body; a fuse consisting of two exothermically alloyable elements in intimate contact with each other, said fuse being connected between said second and said third terminations so that said first and third terminations may serve as the external terminals to which electrical access may be had to said fused capacitor package; and an insulative organic resin coating over a portion of said body, said fuse being embedded in said resin coating.

* * * * *